(12) United States Patent
Heo et al.

(10) Patent No.: US 8,955,405 B2
(45) Date of Patent: Feb. 17, 2015

(54) AUTOMOTIVE TRANSMISSION

(75) Inventors: Chun Nyung Heo, Gyeongsan (KR); Kwang Gi Lee, Gyeongsan (KR); Dong Jae Kim, Gyeongsan (KR)

(73) Assignee: SL Corporation, Daegu (KR)

( * ) Notice: Subject to any disclaimer, the term of this patent is extended or adjusted under 35 U.S.C. 154(b) by 96 days.

(21) Appl. No.: 13/248,406

(22) Filed: Sep. 29, 2011

(65) Prior Publication Data

US 2012/0085193 A1    Apr. 12, 2012

(30) Foreign Application Priority Data

Oct. 11, 2010 (KR) ........................ 10-2010-0098883

(51) Int. Cl.
  *G05G 9/00* (2006.01)
  *F16H 59/04* (2006.01)
  *F16H 59/10* (2006.01)
  *F16H 59/02* (2006.01)

(52) U.S. Cl.
  CPC ................ *F16H 59/04* (2013.01); *F16H 59/10* (2013.01); *F16H 59/0204* (2013.01); *F16H 59/0278* (2013.01); *F16H 59/044* (2013.01); *F16H 2059/0282* (2013.01)
  USPC ...................................................... 74/473.18

(58) Field of Classification Search
  USPC ................. 74/473.18, 473.33, 523, 526, 530
  See application file for complete search history.

(56) References Cited

U.S. PATENT DOCUMENTS

| | | | | |
|---|---|---|---|---|
| 6,089,118 A | * | 7/2000 | Ishii et al. ................... | 74/473.18 |
| 6,427,553 B1 | * | 8/2002 | Hogberg et al. ......... | 74/471 XY |
| 6,568,294 B2 | * | 5/2003 | Jezewski .................... | 74/473.18 |
| 8,397,596 B2 | * | 3/2013 | Tomoda et al. .............. | 74/337.5 |
| 2005/0126326 A1 | * | 6/2005 | Onodera .................... | 74/473.18 |
| 2006/0053930 A1 | * | 3/2006 | Morita et al. .............. | 74/473.18 |
| 2008/0028886 A1 | * | 2/2008 | Molkow et al. ................. | 74/523 |
| 2008/0264194 A1 | * | 10/2008 | Bowman et al. ........... | 74/473.18 |

FOREIGN PATENT DOCUMENTS

| | | |
|---|---|---|
| JP | 2001-233078 A | 8/2001 |
| JP | 2001233076 A | 8/2001 |
| KR | 10-2004-0094903 | 11/2004 |
| WO | WO 2008116437 A1 * | 10/2008 |

* cited by examiner

*Primary Examiner* — Vicky Johnson
(74) *Attorney, Agent, or Firm* — Mintz Levin Cohn Ferris Glovsky and Popeo, P.C.; Kongsik Kim

(57) ABSTRACT

Disclosed herein is an automotive transmission which includes shift lever which moves in a first direction and a second direction to select a shift position and a shift mode selection unit which is installed at one side of the shift lever to select a shift mode. Additionally, the disclosed automotive transmission also includes a shift blocking unit which selectively blocks movement of the shift lever in the first direction and the second direction such that a shift position of the selected shift mode is selected.

24 Claims, 14 Drawing Sheets

AUTOMOTIVE TRANSMISSION

CROSS-REFERENCE TO RELATED APPLICATION

This application claims priority from Korean Patent Application No. 10-2010-0098883 filed on Oct. 11, 2010, and all the benefits accruing therefrom under 35 U.S.C. 119, the contents of which in its entirety are herein incorporated by reference.

BACKGROUND

1. Field of the Invention

The present invention relates to an automotive transmission, and more particularly to an automotive transmission in which various shift modes can be easily selected and shift positions of the selected shift mode can be selected without changing a gate plate.

2. Description of the Related Art

Generally speaking, automotive transmissions change gear ratios in order to constantly maintain the rotation of an engine according to the speed of a vehicle. In order to change the gear ratio, a shift lever or electronic shifting means which is connected to the automotive transmission are typically operated by the driver (in the case of a manual or automated manual transmission).

Transmissions can largely be classified into three types of transmissions, manual transmission, automatic transmission and manumatic transmissions. In a manual transmission, a driver is able to manually change the gear ratio (gear) in the transmission through the use of a lever or stick shifter installed in the car. Inversely, in an automatic transmission, the gears are automatically changed according to the speed of a vehicle. The driver need only select Park (P), Reverse (R), Neutral (N) or Drive (D).

More recently manumatic transmissions have begun to be offered to drivers as an alternative to the conventional manual and automatic transmission. A manumatic transmission offer drivers the ability to be operated like a manual and an automotive transmission. Notably, in a manumatic transmission the gear ratio in may be changed by the driver to operate the manumatic transmission in a manual shift operation style while performing the automatic shift operation. This shift operation may be performed by the same automatic shift device or may be operated separately from automatic shift device.

As mentioned above, the shift modes of the automotive transmission may be largely classified into the automatic and the manual, and sometimes, a manumatic which uses both automatic shifting styles and the manual shifting styles. However, since an automatic and a manual transmission have different selectable shift positions, separate gate plates must be used for the respective modes. Thus, when both the automatic shift mode and the manual shift mode applied in the manumatic transmission, the structure is complicated and the cost is increased.

Therefore, the current technology requires a technique in which the driver can easily select the shift mode while at the same time simplifying the structure without using separate gate plates for the automatic shift mode and the manual shift mode, respectively.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides an automotive transmission that allows a driver to easily select a shift mode while at the same time reducing the cost and simplifying a structure by using one gate plate for a plurality of shift modes. Additionally, the present invention also blocks selection of a shift position which is not included in the shift mode selected by the driver.

The automotive transmission according to the present invention provides at least one of the following effects. First, since the driver can easily select the shift mode, there is an effect of increasing convenience of the driver. Second, since one gate plate is used in both the automatic shift mode and the manual shift mode, it is not required to provide separate gate plates for the respective shift modes. Accordingly, there is an effect of simplifying the structure and reducing the cost. Third, it is possible to block the movement of a shift lever to a shift position that is not included in the shift mode selected by the driver. Accordingly, there is an effect of preventing occurrence of car accidents.

The effects of the present invention are not limited thereto, and the other effects of the present invention can be apparently understood from the following description.

According to an aspect of the present invention, there is provided an automotive transmission that includes a shift lever which moves in a first direction and a second direction to select a shift position; a shift mode selection unit which is installed at one side of the shift lever to select a shift mode; and a shift blocking unit which selectively blocks movement of the shift lever in the first direction and the second direction such that a shift position of the selected shift mode is selected.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE DISCLOSURE

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification. In the attached figures, the thickness of layers and regions is exaggerated for clarity.

Figure 1:
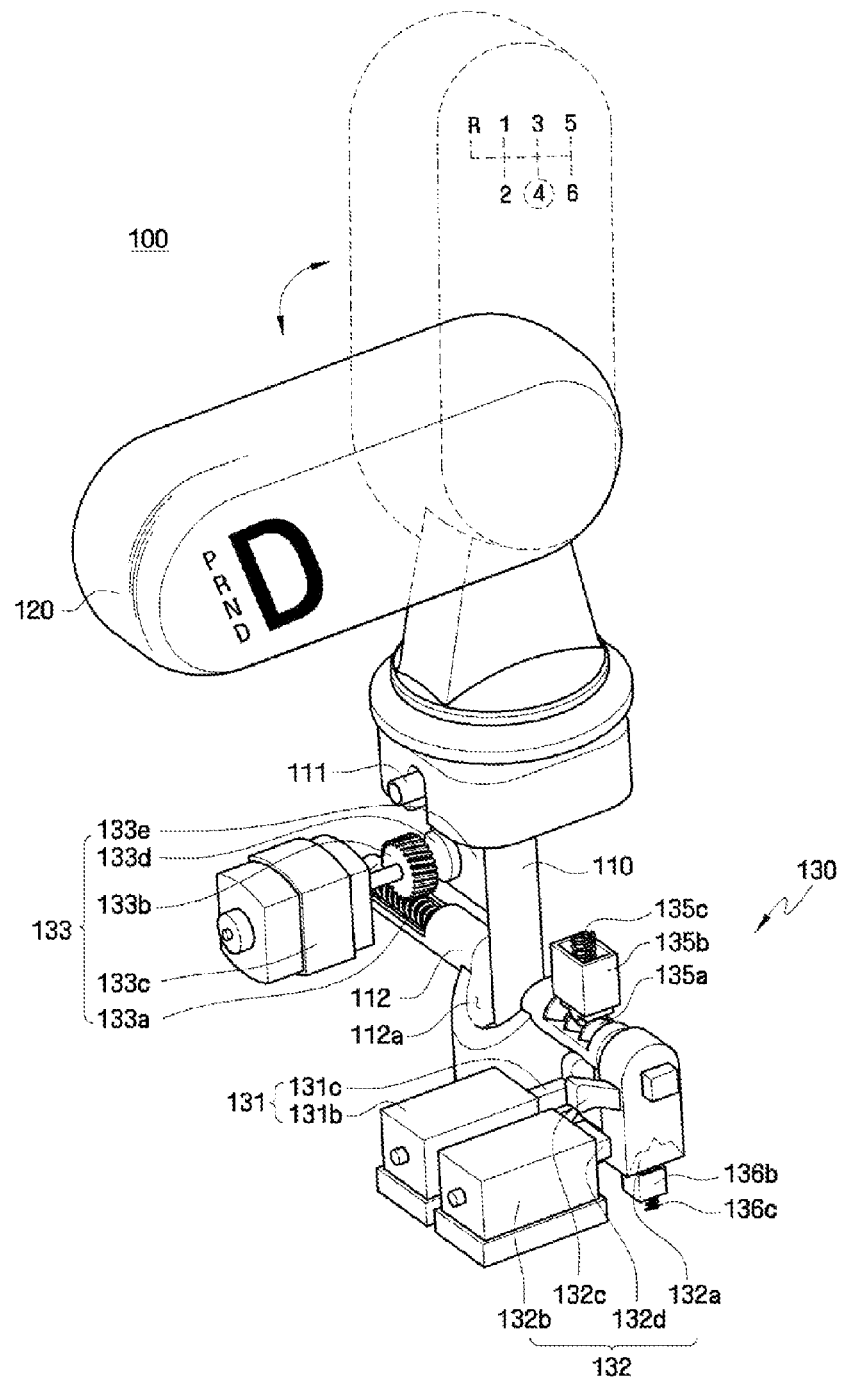
FIGS. 1 to 3 are perspective views showing an automotive transmission in accordance with an illustrative embodiment of the present invention.
Figure 2:
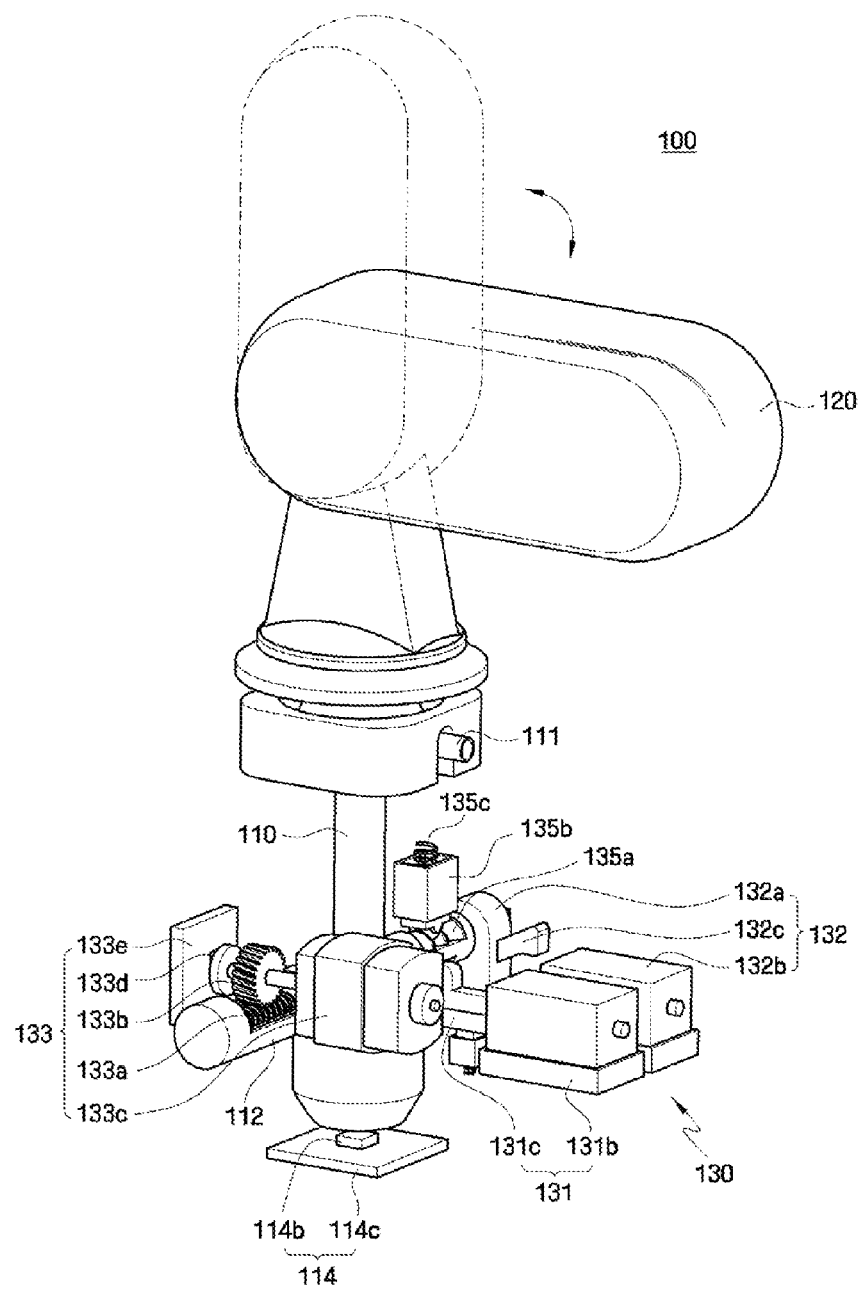
Figure 3:
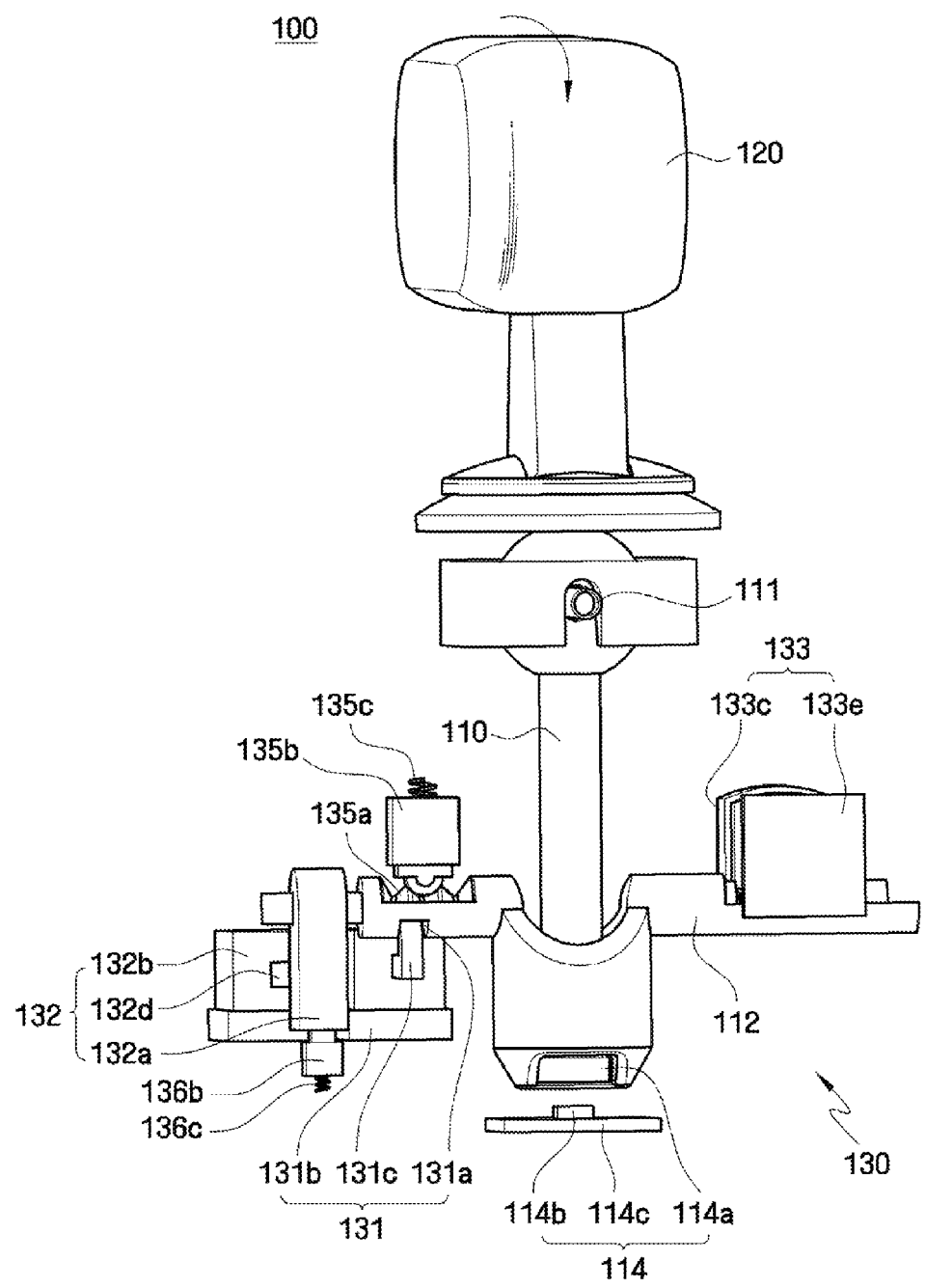

FIGS. 1 to 3 are perspective views showing an automotive transmission in accordance with an embodiment of the present invention. As shown in FIGS. 1 to 3, an automotive transmission 100 in accordance with the illustrative embodiment of the present invention may include a shift lever 110 which moves in a first direction and a second direction to select a shift position, a shift mode selection unit 120 which is installed on one side of the shift lever 110 to select a shift mode, and a shift blocking unit 130 which selectively blocks the movement of the shift lever 110 in the first direction and the second direction so that a shift position of a shift mode selected by the shift mode selection unit 120 can be selected.

In the embodiment of the present invention, a shift mode can be selected between an automatic shift mode in which shift positions such as a parking (P) stage, a reverse (R) stage, a neutral (N) stage, a drive (D) stage can be selected, and a manual shift mode in which sequential gear positions/ratios such as a first gear, a second gear and a third gear can be selected as shift positions. However, this is merely exemplary, and the number and types of shift positions which can be selected in the automatic shift mode and the manual shift mode can be changed and altered if necessary.

The shift lever 110 may move in the first direction by rotating with respect to a first shaft 111. Further, the shift lever 110 may move in the second direction by rotating with respect to a second shaft 112 located below the first shaft 111 so that the first shaft 111 and the second shaft 112 cross each other at a specific angle. Although the first shaft 111 is perpendicular to the second shaft 112 such that the shift lever 110 can move in a horizontal direction and a vertical direction in the embodiment of the present invention, an angle between the first shaft 111 and the second shaft 112 may be changed so that the shift lever 110 can move not only in the horizontal and vertical directions but also in a diagonal direction according to the shape of a passage formed in a gate plate. In other words, the shift lever 110 may move in all directions according to the shape of the passage formed in the gate plate. Accordingly, the angle between the first shaft 111 and the second shaft 112 may vary in certain configurations.

Figure 4:
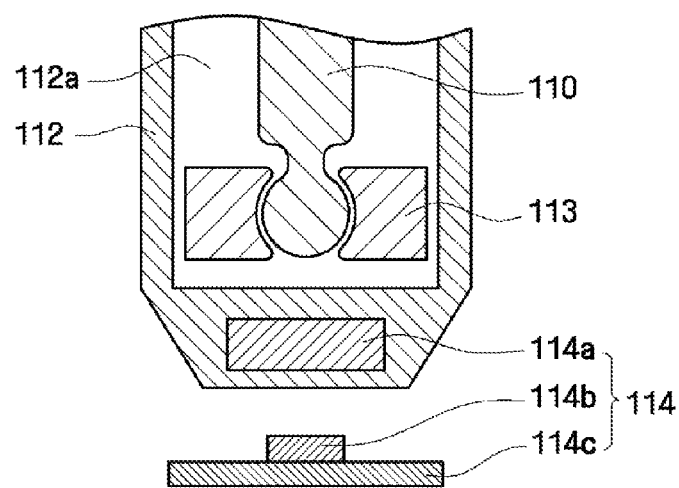
FIG. 4 is a cross-sectional view showing a coupling structure of a shift lever in accordance with the illustrative embodiment of the present invention.

As shown in FIG. 4, one end of the shift lever 110 opposite to the shift mode selection unit 120 may be inserted into an insertion groove 112a formed in the second shaft 112 to be hinge-coupled with the second shaft 112 via a bearing 113. Accordingly, since the second shaft 112 can move in the horizontal direction even when the shift lever 110 moves in the first direction by rotating with respect to the first shaft 111, it is possible to prevent wasting space comparative to when the second shaft 112 rotates.

Further, a position sensing unit 114, which detects a shift position selected by the shift lever 110 by sensing a position of the shift lever 110, may be provided at one side of the second shaft 112, e.g., at a position separated from one end of the shift lever 110 by a predetermined distance. The position sensing unit 114 may include a magnet 114a installed on one side of the insertion groove 112a of the second shaft 112, a sensor 114b which senses variation in magnetic flux density due to the magnet 114a changing its position according to the movement of the shift lever 110, and a printed circuit board 114c on which the sensor 114b is installed.

In this case, the sensor 114b may be a three dimensional (3D) sensor which may detect the magnetic flux density in the X-axis, Y-axis and Z-axis directions according to the change in position of the magnet 114a. Accordingly, the position of the shift lever 110 can be detected by using only one sensor without using a separate sensor in each moving direction of the shift lever 110. Further, although the sensor 114b and the printed circuit board 114c are provided separately in the embodiment of the present invention, the sensor 114b and the printed circuit board 114c may be formed integrally without being limited thereto. Even furthermore, although a 3D sensor is used as the sensor 114b for sensing the magnetic flux density according to the change in position of the magnet 114a in the embodiment of the present invention, it is merely exemplary to facilitate the understanding of the present invention, and a two dimensional (2D) sensor such as a linear hall sensor and a switch hall sensor may be alternatively used without being limited thereto. In case of using the 2D sensor, a plurality of 2D sensors may be used according to the moving directions of the shift lever 110 or selected shift positions.

Figure 5:
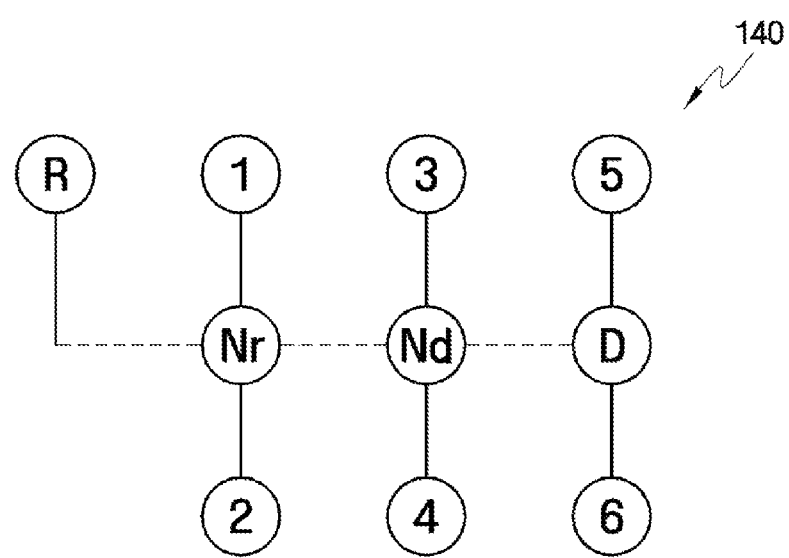
FIG. 5 is a schematic diagram showing a gate plate in accordance with the illustrative embodiment of the present invention.

Meanwhile, a gate plate corresponding to the shift positions which can be selected by the shift lever 110 in the illustrative embodiment of the present invention is illustrated in FIG. 5. Referring to FIG. 5, the automatic shift mode and the manual shift mode can be executed by using the same gate plate 140. In this way, in the illustrative embodiment of the present invention, the shift positions of the automatic shift mode and the manual shift mode can be selected without changing the gate plate 140 according the shift mode (i.e., manual or automatic). Accordingly, there is no need to separately provide the gate plate for each shift mode, thereby preventing an increase in cost and preventing the process from being overly complicated. That is, in the illustrative embodiment of the present invention, one gate plate 140 may be used in the automatic shift mode and the manual shift mode, and may have different gate patterns according to selective blocking of the shift blocking unit 130.

In the illustrative embodiment as shown in FIG. 5, the shift positions of the automatic shift mode include the Nd stage and the Nr stage in addition to the D stage and the R stage. In some embodiments, the automatic shift mode has a self restoration function resulting from a restoring part 133 that will be described later. In that embodiment, although the driver moves the shift lever 110 from the N stage to the D stage, the shift lever 110 is restored to the position of the N stage. Accordingly, the initial N stage may be regarded as the D stage. Further, it is required to pass the N stage to shift the transmission into an R stage from the D stage in the automatic shift mode. Accordingly, in this case, the R stage is selected after passing the Nd stage and the Nr stage.

In the illustrative embodiment of the present invention, in the gate plate 140 shown in FIG. 5, the movement of the shift lever 110 in the first direction means that the shift position is shifted to the R stage and first through sixth gear in the direction represented by solid lines. The movement of the shift lever 110 in the second direction means that the shift position is shifted to the Nr, Nd and D stages in the direction represented by a dotted line. However, this is merely exemplary to facilitate the understanding of the present invention, and the number, types and positions of shift positions which may be changed variously if necessary.

The shift mode selection unit 120 is rotatably installed at one side of the shift lever 110, and may select the shift mode according to the rotation direction. The shift mode selection unit 120 may also serve as a knob installed at one side of the shift lever 110. Accordingly, a driver may change the shift mode and also select a desired shift position through the shift mode selection unit 120.

In the embodiment of the present invention, the automatic shift mode is selected when the shift mode selection unit 120 is positioned in a direction perpendicular to the shift lever 110, and the manual shift mode is selected when the shift mode selection unit 120 is positioned in a direction parallel and tandem to the shift lever 110. However, this is merely exemplary to facilitate the understanding of the present invention, and the shift mode corresponding to the position of the shift mode selection unit 120 according to the rotation direction may be changed accordingly. For example, referring again to FIGS. 1 to 3, since the shift mode selection unit 120 is positioned in the direction perpendicular to the shift lever 110 (solid line), the automatic shift mode is selected. If the shift mode selection unit 120 is rotated to be parallel and tandem to the shift lever 110 (dotted line), the manual shift mode may be selected.

Hereinafter, various examples of the rotation structure of the shift mode selection unit 120 in accordance with the illustrative embodiment of the present invention will be described.

Figure 6:
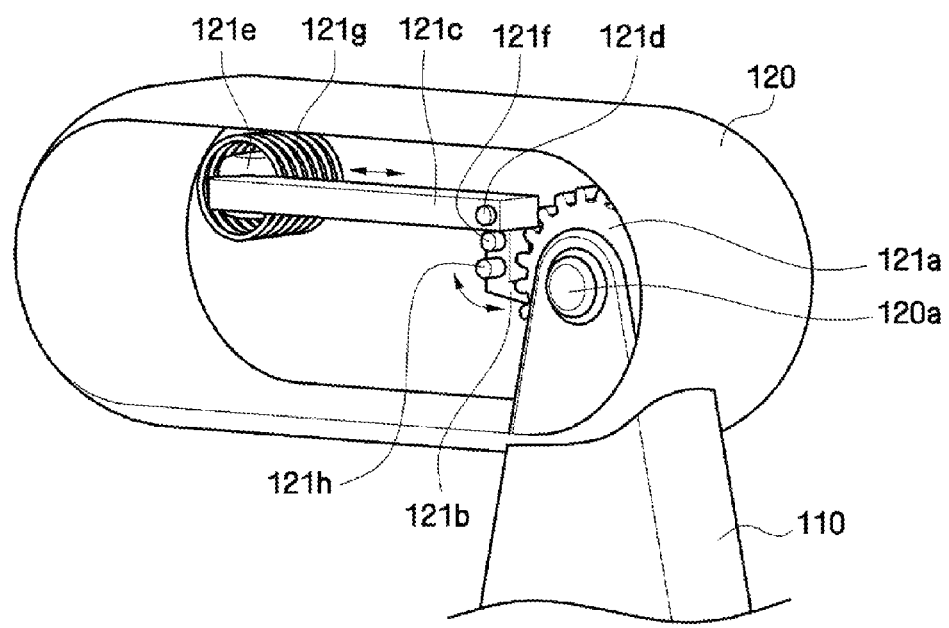
FIGS. 6 and 7 are diagrams schematically showing a rotation structure of a shift mode selection unit in accordance with a first illustrative embodiment of the present invention.
Figure 7:
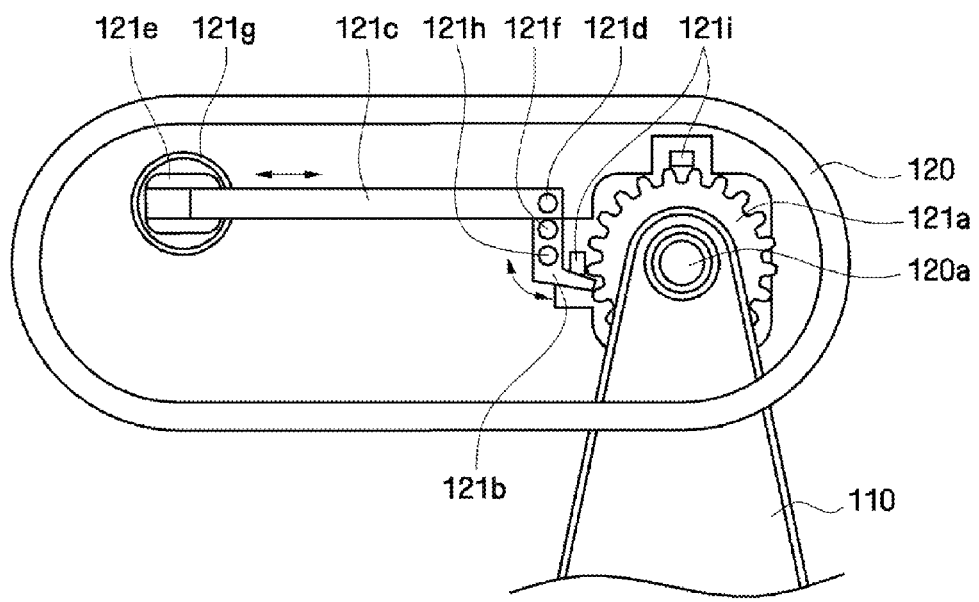

FIGS. 6 and 7 are diagrams schematically showing a shift mode selection unit in accordance with a first illustrative embodiment of the present invention. As shown in FIGS. 6 and 7, the shift mode selection unit 120 in accordance with the first illustrative embodiment of the present invention may include a gear 121a rotatably installed on a rotational shaft 120a of the shift mode selection unit 120 to rotate with the shift mode selection unit 120, a hook 121b which is inserted into or separated from the teeth of the gear 121a, one end of a rod 121c being rotatably connected to one end of the hook 121b via a hinge axle 121d, and a button 121e positioned at the other end of the rod 121c.

In this case, one end of the rod 121c in contact with the button 121e is formed slantingly. When the driver presses the button 121e, the rod 121c moves toward the hook 121b via the slanted surface. Accordingly, the hook 121b is rotated around a hinge axle 121f and separated from the teeth of the gear 121a, thereby allowing the shift mode selection unit 120 to be in a rotatable state.

Inversely, when the driver does not press or releases the button 121e, the rod 121c is restored to its original position via a spring 121g, and the hook 121b is inserted into the teeth of the gear 121a, thereby putting the shift mode selection unit 120 in a non-rotatable state.

Furthermore, in this particular illustrative embodiment, a magnet 121h is installed on the hook 121b, and a plurality of sensors 121i capable of sensing the magnet 121h are installed on the side of the gear 121a to detect the position of the shift mode selection unit 120. Accordingly, it is possible to determine whether the automatic shift mode or the manual shift mode is selected. Although the plurality of sensors 121i include two sensors to detect whether the shift mode selection unit 120 is positioned in the direction perpendicular or parallel to the shift lever 110 in the illustrative embodiment of FIGS. 6 and 7, this is merely exemplary to facilitate the understanding of the present invention, and at least one sensor may be installed in a moving path corresponding to the rotation of the shift mode selection unit 120 without being limited thereto. In this case, it is possible to detect the position of the shift mode selection unit 120 between the perpendicular direction and the parallel direction as well as the positions in the perpendicular direction and the parallel direction. Accordingly, when the rotation of the shift mode selection unit 120 is not completely performed, a warning light or warning sound can be provided to the driver, thereby preventing occurrence of car accidents.

Figure 8:
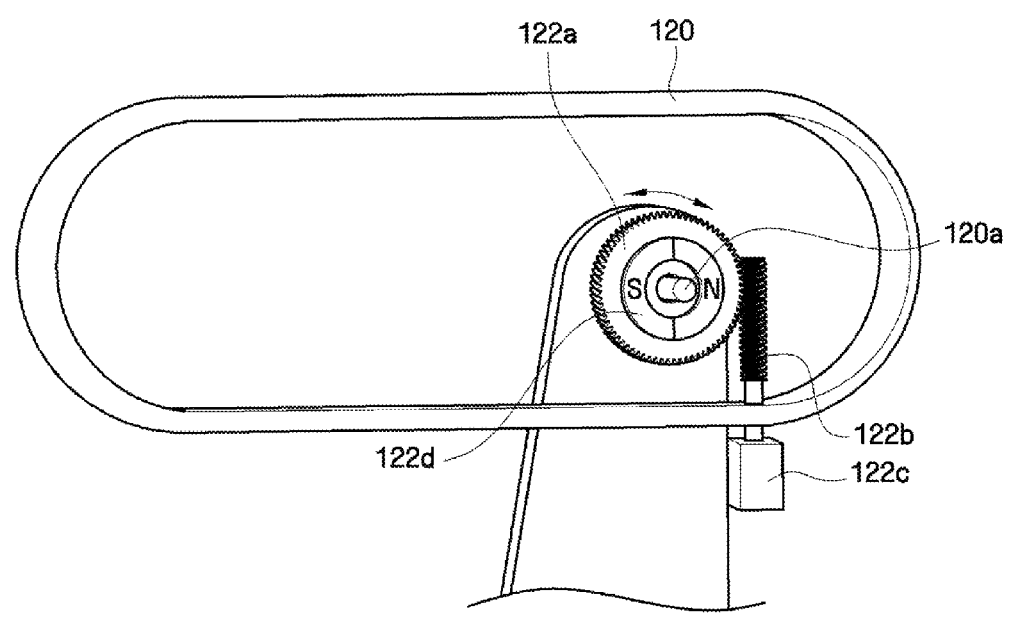
FIG. 8 is a diagram schematically showing a rotation structure of a shift mode selection unit in accordance with a second illustrative embodiment of the present invention.

FIG. 8 is a diagram schematically showing a shift mode selection unit in accordance with a second illustrative embodiment of the present invention. As shown in FIG. 8, the shift mode selection unit 120 in accordance with the second illustrative embodiment of the present invention may include a gear 122a installed on the rotational shaft 120a to rotate with the shift mode selection unit 120, a worm gear 122b engaged with the gear 122a, a motor 122c providing a rotational force to the worm gear 122b, and a magnet sensor 122d positioned at one side of the gear 122a. The shift mode selection unit 120 of the second illustrative embodiment is configured such that the rotation direction of the shift mode selection unit 120 can be changed according to the rotation direction of the motor 122c. The driver may select the rotational direction of the shift mode selection unit 120 by operation of at least one button installed for the rotation of the shift mode selection unit 120. In this case, the rotational direction may be selected by using a button separately installed for each direction, or only one button. Furthermore, when a certain shift mode is selected by the shift mode selection unit 120, the motor 122c enters a non-rotatable state to prevent the rotation of the shift mode selection unit 120.

Although the automatic shift mode or the manual shift mode may be selected by the driver's button operation in the second illustrative embodiment of the present invention, this is merely exemplary, and it is not limited thereto. For example, the rotation in one direction may be performed by the motor 122c and the rotation in the other direction may be performed manually as the shift mode selection unit 120 is rotatable by an external force instead of the motor 122c.

Figure 9:
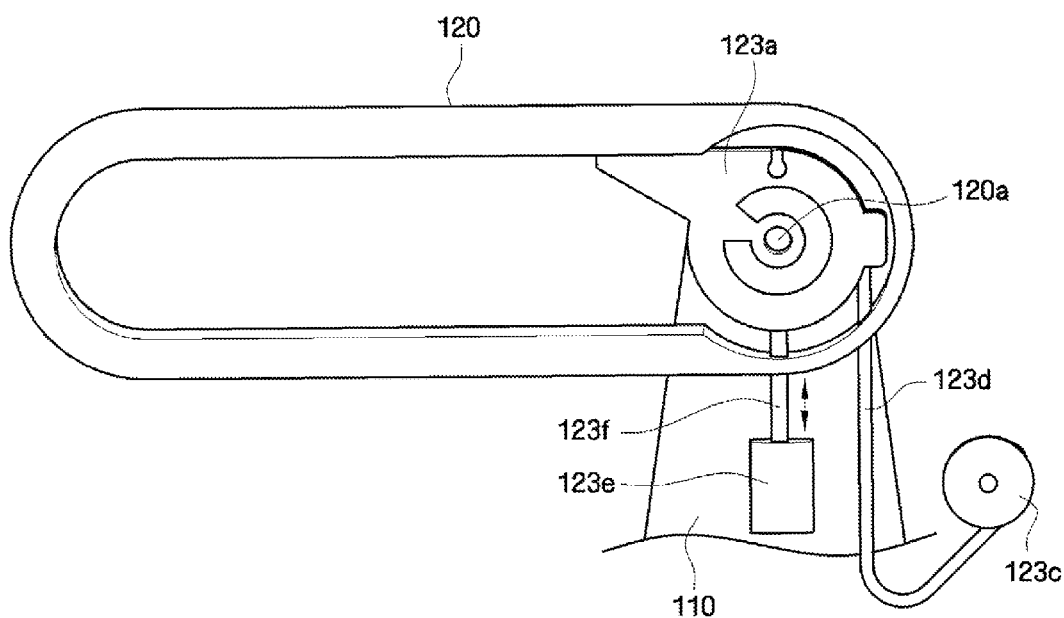
FIGS. 9 and 10 are diagrams schematically showing a rotation structure of a shift mode selection unit in accordance with a third illustrative embodiment of the present invention.
Figure 10:
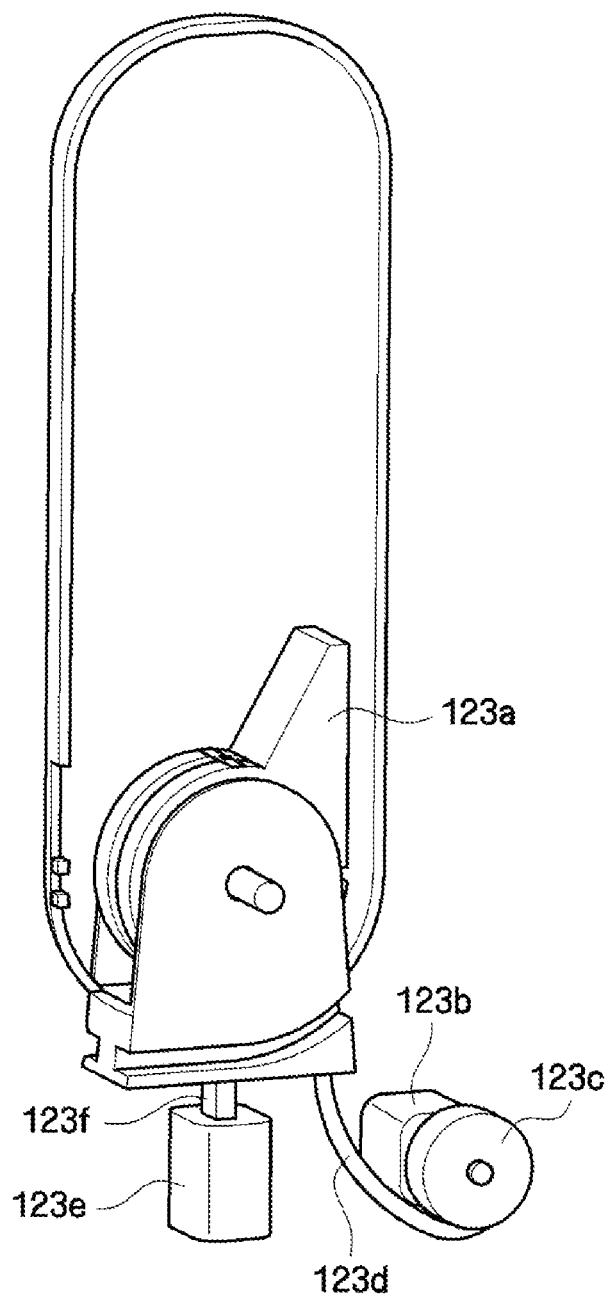

FIGS. 9 and 10 are diagrams schematically showing a shift mode selection unit in accordance with a third illustrative embodiment of the present invention. FIG. 9 illustrates a case in which the automatic shift mode is selected, and FIG. 10 illustrates a case in which the manual shift mode is selected.

As shown in FIGS. 9 and 10, the shift mode selection unit 120 in accordance with the third illustrative embodiment of the present invention may include a rotation support part 123a installed on the rotational shaft 120a of the shift mode selection unit 120 to rotate with the shift mode selection unit 120, a cable 123d having one side fixedly connected to the rotation support part 123a and the other side connected to a rotational body 123c connected to a rotational shaft of a motor 123b, and a rotation preventing part 123e which prevents the rotation of the shift mode selection unit 120 if a certain shift mode is selected by the shift mode selection unit 120.

In this illustrative embodiment, when the manual shift mode is selected and the shift mode is shifted from the automatic shift mode of FIG. 9 to the manual shift mode of FIG. 10, the cable 123d is wound on the rotational body 123c by actuating the motor 123b. In this case, since the cable 123d is fixedly installed on the rotation support part 123a, the shift mode selection unit 120 is rotated by the actuation of the motor 123b. Meanwhile, when the driver intends to select the automatic shift mode such that the shift mode is shifted from the manual shift mode of FIG. 10 to the automatic shift mode of FIG. 9, the motor 123b is not actuated, but the shift mode selection unit 120 is made in a rotatable state, so that the driver can manually select the automatic shift mode. Further, in the illustrative embodiment of FIGS. 9 and 10, in the actuation of the motor 123b, the driver may actuate the motor 123b through a button separately provided in a vehicle.

The rotation preventing part 123e may be formed of a solenoid having a rod 123f movable in one direction. The rod 123f is inserted into or separated from a rotation prevention groove (not shown) formed at a specific position of the rotation support part 123a, thereby preventing the rotation of the shift mode selection unit 120. In the third illustrative embodiment of the present invention, when the manual shift mode is selected by the shift mode selection unit 120, the rod of the rotation preventing part 123e is inserted into the rotation prevention groove (not shown) to prevent the rotation of the shift mode selection unit 120.

Although the rotation is prevented only when the manual shift mode is selected in the third illustrative embodiment of the present invention, this is merely exemplary to facilitate the understanding of the present invention, and it is not limited thereto. For example, the rotation of the shift mode selection unit 120 may be prevented only in the automatic shift mode. The rotation of the shift mode selection unit 120 may be prevented in both of the automatic shift mode and the manual shift mode by forming a plurality of rotation prevention grooves in the rotation support part 123a.

Figure 11:
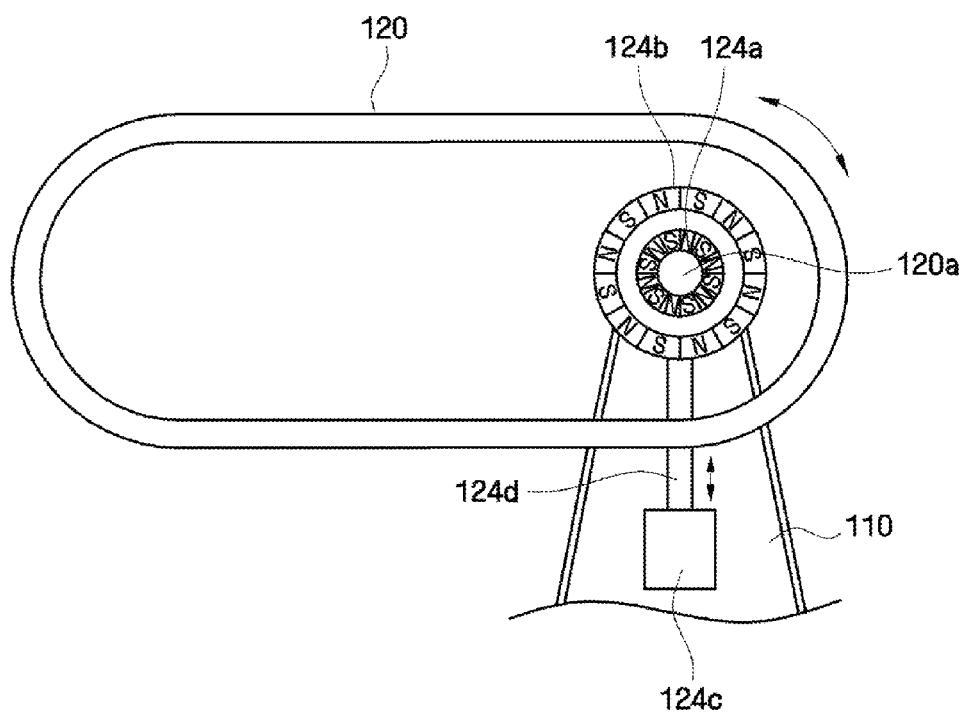
FIG. 11 is a diagram schematically showing a rotation structure of a shift mode selection unit in accordance with a fourth illustrative embodiment of the present invention.

FIG. 11 is a diagram schematically showing a shift mode selection unit in accordance with a fourth illustrative embodiment of the present invention. As shown in FIG. 11, the shift mode selection unit 120 in accordance with the fourth illustrative embodiment of the present invention may include a first magnet 124a fixedly installed on the rotational shaft 120a of the shift mode selection unit 120, and a second magnet 124b surrounding the first magnet 124a to rotate with the shift mode selection unit 120. The driver may select a desired shift mode by rotating the shift mode selection unit 120 in a specific direction. When the selection of the shift mode is completed, the rotation may be prevented by a rotation preventing part 124c. In the illustrative embodiment of FIG. 11, the rotation preventing part 124c may be formed of a solenoid having a rod 124d movable in one direction. After a certain shift mode is selected, the rod 124d may be inserted into or separated from a rotation prevention groove 120b formed in the rotational shaft 120a of the shift mode selection unit 120 to prevent the rotation of the shift mode selection unit 120.

In this illustrative embodiment, a sensor (not shown) installed at one side of the first magnet 124a and the second magnet 124b may sense the variation in magnetic flux density generated between the first magnet 124a and the second magnet 124b, thereby determining whether the shift mode is selected. A control signal is generated according to the determination results and transmitted to the rotation preventing part 124c, thereby moving the rod 124d in one direction. Further, the rotation preventing part 124c may prevent the rotation only in any one of the automatic shift mode and the manual shift mode, or may prevent the rotation in all shift modes.

As described above, although various rotational structures of the shift mode selection unit 120 have been described in the illustrative embodiments of FIGS. 6 to 11, these are merely exemplary to facilitate the understanding of the present invention, and various modifications may be made without being limited thereto.

Referring again to FIGS. 1 to 3, when a certain shift mode is selected by the shift mode selection unit 120 as described above, the shift blocking unit 130 selectively blocks the movement of the shift lever 110 in the first direction and the second direction so that only the shift positions corresponding to the selected shift mode can be selected. The shift blocking unit 130 may block the selection of the R gear unless certain conditions are present.

The shift blocking unit 130 in accordance with the illustrative embodiment of the present invention may include a first shift blocking unit 131 which blocks the movement of the shift lever 110 in the first direction, and a second shift blocking unit 132 which blocks the movement of the shift lever 110 in the second direction. The first shift blocking unit 131 may include a blocking groove 131a formed on the second shaft 112, and a first blocking part 131b having a rod 131c which is inserted into or separated from the blocking groove 131a. The first blocking part 131b may be formed of a solenoid to move the rod 131c in one direction. When the rod 131c is inserted into the blocking groove 131a, the first blocking part 131b may block the movement of the shift lever 110 in the first direction. In this case, the first shift blocking unit 131 may block the movement of the shift lever 110 in which the shift position is shifted to the first to sixth gears in the automatic shift mode.

The second shift blocking unit 132 may include a blocking member 132a fixedly installed at one end of the second shaft 112 and a second blocking part 132b. The blocking member 132a may be rotated with the rotation of the second shaft 112, and may have a blocking protrusion 132c. In this case, the second blocking part 132b may include a rod 132d similarly to the first blocking part 131b. The rod 132d is positioned in a moving path of the blocking protrusion 132c to block the movement in the second direction. The movement in the second direction is blocked in order to prevent the shift position from being shifted to reverse (R) while a vehicle is traveling forward. In reverse movement, the rod 132d is kept out of the moving path of the blocking protrusion 132c, so that reverse (R) can be selected.

Meanwhile, the shift blocking unit 130 may include a restoring part 133 which restores the shift lever to the N stage when the shift mode is changed to the automatic shift mode from the manual shift mode in which any one of the first to sixth gears are selected.

The restoring part 133 may include a lead screw 133a positioned on the second shaft 112, a gear 133b engaged with the lead screw 133a, and a motor 133c connected to the gear 133b. The gear 133b is provided with a magnet 133d which is connected to a rotational shaft of the motor 133c in the same way as the gear 133b to rotate with the gear 133b in the actuation of the motor 133c. Further, a sensing part 133e which detects the position of the shift lever 110 by sensing the magnetic flux density according to the position of the magnet 133d may be positioned to be separated from the magnet 133d by a predetermined distance. In this case, the sensing part 133e may include a printed circuit board and a sensor installed on the printed circuit board.

As an example of the operation of the restoring part 133, if the driver selects the automatic shift mode when the first stage/gear is selected in the manual shift mode, the selected shift position is detected by the sensing part 133e and the motor 133c rotates in an appropriate direction to restore the shift lever 110 to the neutral position. In this case, when being restored to the neutral position, the shift lever 110 is positioned at the Nd stage by a second groove 136 that will be described later.

As described above, blocking of the second shift blocking unit 130 will be explained on the gate plate of FIG. 5.

Figure 12:
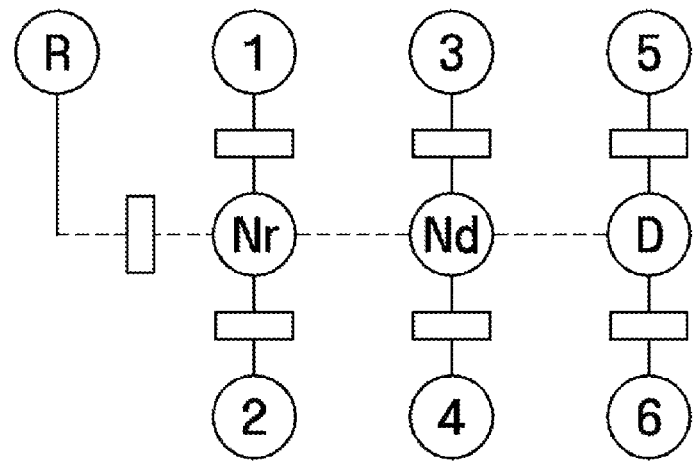
FIG. 12 is a schematic diagram showing shift positions blocked by a first shift blocking unit in accordance with the illustrative embodiment of the present invention.

FIG. 12 is a schematic diagram showing the shift positions blocked by the first shift blocking unit in accordance with the illustrative embodiment of the present invention. In FIG. 12, rectangles represented in the moving paths to the first to sixth stages/gears and reverse (R) may mean that the movement of the shift lever 110 is blocked.

As shown in FIG. 12, the first shift blocking unit 131 may block the movement of the shift lever 110 in the first direction, i.e., shifting to the first to sixth stages/gears, thereby preventing the shift positions corresponding to the manual shift mode from being selected in the automatic shift mode. Further, since the selection reverse (R) should be blocked in most cases, the movement in the second direction is blocked by the second shift blocking unit 132.

Figure 13:
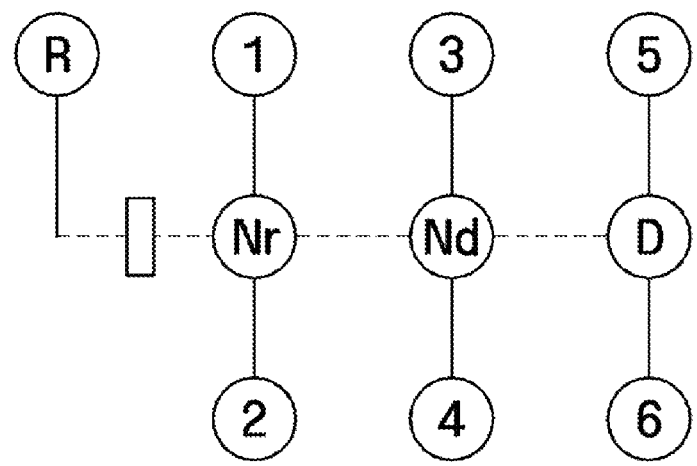
FIG. 13 is a schematic diagram showing a shift position blocked by a second shift blocking unit in accordance with the illustrative embodiment of the present invention.

FIG. 13 is a schematic diagram showing the shift position blocked by the second shift blocking unit in accordance with the illustrative embodiment of the present invention. In FIG. 13, a rectangle represented in the moving path to reverse (R) may mean that the movement of the shift lever 110 is blocked. As shown in FIG. 13, the second shift blocking unit 132 may block the movement of the shift lever 110 in the second direction, i.e., shifting into reverse (R). It can be understood that the manual shift mode is selected in the case of FIG. 13. The selection reverse (R) may be blocked unless certain conditions are present or required.

As shown in FIGS. 12 and 13, the second shift blocking unit 132 may block the movement into reverse (i.e., the R stage) not only in a specific selected shift mode, but also in both of the manual shift mode and the automatic shift mode.

Meanwhile, the automotive transmission 100 in accordance with the illustrative embodiment of the present invention may provide an operation feeling to the driver when the shift lever 110 moves in the first direction and the second direction. For example, the operational feeling in the first direction may be realized by a first groove 135a formed in the second shaft 112 and having an irregular shape, a first bullet 135b moving along the irregular surface of the first groove 135a, and a spring 135c supporting the first bullet 135b. In this case, the position of the first bullet 135b is fixed, and when the shift lever 110 moves in the first direction by rotating with respect to the first shaft 111, the second shaft 112 also moves in the first direction. Accordingly, the operation feeling is generated by the first bullet 135b.

Figure 14:
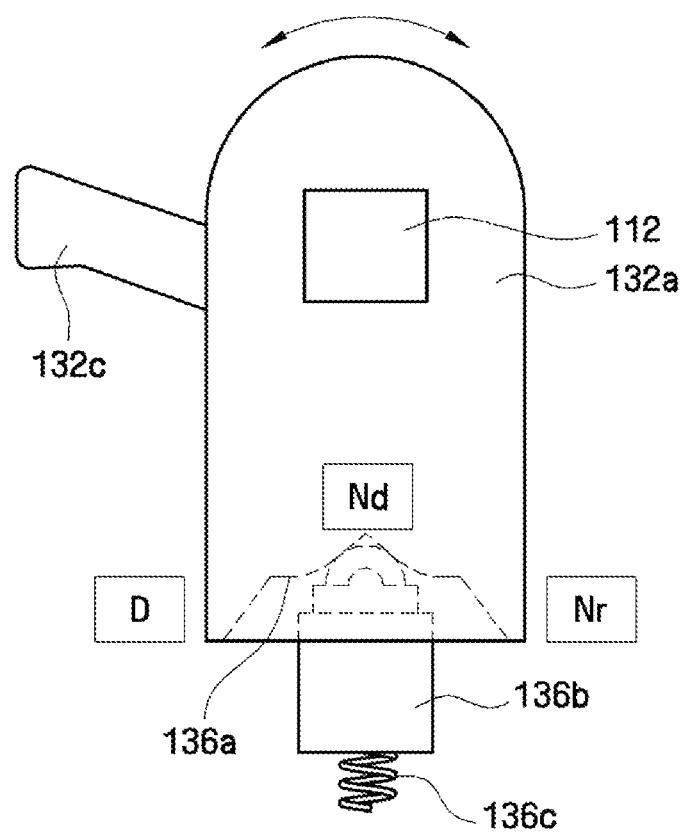
FIG. 14 is a schematic diagram showing a structure generating an operation feeling in an automatic shift mode in accordance with the illustrative embodiment of the present invention.

Further, the operational feeling in the second direction may be realized, as shown in FIG. 14, by a second groove 136a formed at one side of the blocking member 132a of the second shift blocking unit 132, a second bullet 136b moving along the second groove 136a in the rotation of the second shaft 112, and a spring 136c supporting the second bullet 136b. In this case, the second groove 136a is formed to have a larger depth as it goes inward, and the position of the second bullet 136b is fixed. Accordingly, when the driver moves the shift lever 110 in the automatic shift mode, the second bullet 136b moves toward the outside of the second groove 136a and then is restored to its original position because the inside of the second groove 136a is formed with a deep depression. This can be understood by the fact that the Nr and Nd stages are included in the gate plate 140 of FIG. 5.

Figure 15:
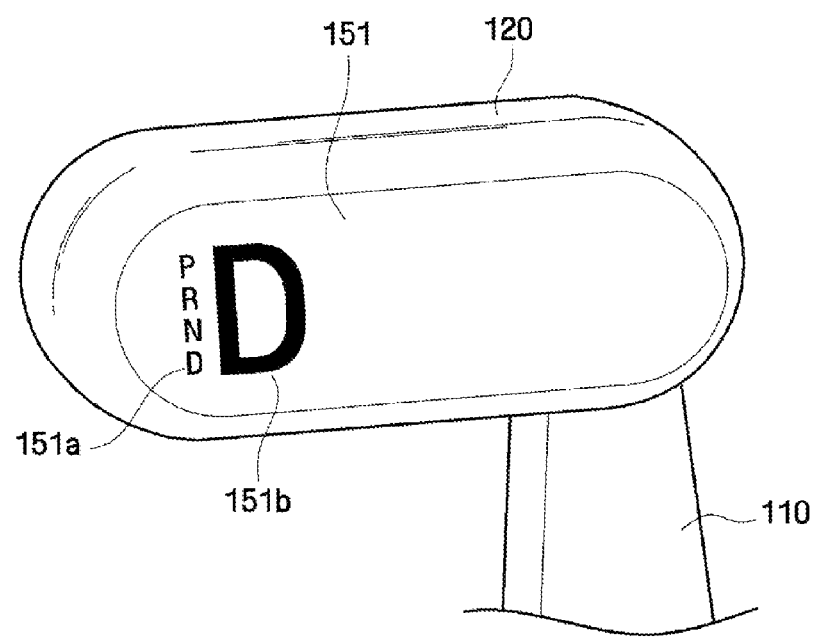
FIG. 15 is a schematic diagram showing shift positions displayed in the automatic shift mode in accordance with the illustrative embodiment of the present invention.
Figure 16:
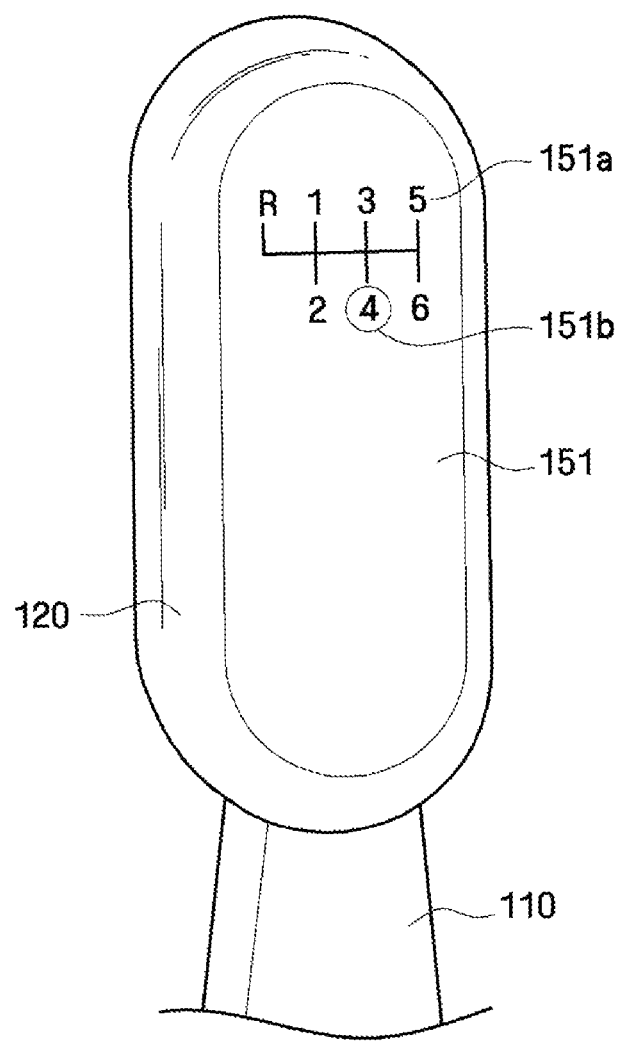
FIG. 16 is a schematic diagram showing shift positions displayed in a manual shift mode in accordance with the illustrative embodiment of the present invention.

Meanwhile, a display part 151 may be formed on the outside of the shift mode selection unit 120 as shown in FIGS. 15 and 16. The display part 151 displays selectable shift positions 151a and a currently selected shift position 151b in the selected shift mode. Although the display part 151 is formed as a liquid crystal display device in the illustrative embodiment of the present invention, this is merely exemplary to facilitate the understanding of the present invention, and various types of display devices may be used without being limited thereto.

In this case, the selectable shift positions 151a and the currently selected shift position 151b displayed in the display part 151 of the shift mode selection unit 120 do not change until the rotation in any direction is completed. That is, the selectable shift positions 151a and the currently selected shift position 151b in the previously selected shift mode are displayed until the rotation in any direction is completed, and the selectable shift positions 151a and the currently selected shift position 151b in the changed shift mode are displayed after the rotation has been completed. Further, while the shift mode selection unit 120 is rotating, the display part 151 may provide the driver with information indicating that the selection of a certain shift mode has not been completed. This display method of the display part 151 is merely exemplary to facilitate the understanding of the present invention, and it is not limited thereto.

In conclusion, those skilled in the art will appreciate that many variations and modifications can be made to the preferred illustrative embodiments without substantially departing from the principles of the present invention. Therefore, the disclosed preferred embodiments of the invention are used in a generic and descriptive sense only and not for purposes of limitation.

What is claimed is:

1. An automotive transmission comprising:
a shift lever configured to move in a first direction that includes a first set of shift positions to provide a first shift mode and a second direction that includes a second set of shift positions to provide a second shift mode;
a knob rotatably attached on one end of the shift lever to select one of the first shift mode and the second shift mode by rotating the knob about the one end of the shift lever to which the knob is rotatably attached to the shift lever; and
a shift blocking unit configured to (i) selectively block the shift lever from moving from one of the first set of shift positions to one of the second set of shift positions in case where the first shift mode is selected, and (ii) selectively block the shift lever from moving from one of the second set of shift positions to one of the first set of shift positions in case where the second shift mode is selected.

2. The automotive transmission of claim 1, wherein the first shift mode is an automatic shift mode and the second shift mode is a manual shift mode.

3. The automotive transmission of claim 2, wherein one gate plate is used for the automatic shift mode and the manual shift mode.

4. The automotive transmission of claim 3, wherein the automatic shift mode and the manual shift mode have different gate patterns according to selective blocking by the shift blocking unit.

5. The automotive transmission of claim 2, wherein the shift mode selection unit comprises:

a gear which is rotatably installed on a rotational shaft of the shift mode selection unit;
a hook which is inserted into or separated from teeth of the gear and rotates around a hinge axle;
a rod which is rotatably connected to one end of the hook;
a button which applies an external force to the rod to move the rod in one direction;
a spring which restores the rod to its original position when the external force is removed;
a magnet which is installed on the hook; and
a plurality of sensors which sense the magnet.

6. The automotive transmission of claim 2, wherein the shift mode selection unit comprises:
a gear which is installed on a rotational shaft of the knob;
a worm gear which is engaged with the gear; and
a motor which is connected to the worm gear to provide a rotational force to the worm gear,
wherein when a certain shift mode is selected by the shift mode selection unit, the motor enters a non-rotatable state to prevent the rotation of the shift mode selection unit.

7. The automotive transmission of claim 2, wherein the shift mode selection unit comprises:
a rotation support part installed on a rotational shaft of the shift mode selection unit;
a cable which has one side fixedly connected to the rotation support part;
a rotational body connected to the other side of the cable;
a motor which has a rotational shaft connected to the rotational body and is actuated such that the cable is wound on the rotational body; and
a rotation preventing part configured to prevent a rotation of the shift mode selection unit when a certain shift mode is selected by the shift mode selection unit.

8. The automotive transmission of claim 7, wherein when it is intended to rotate the shift mode selection unit in one direction, the motor is actuated, and when it is intended to rotate the shift mode selection unit in the other direction, the motor enters a non-actuated state and the shift mode selection unit enters a rotatable state.

9. The automotive transmission of claim 2, wherein the shift mode selection unit comprises:
a first magnet installed to surround a rotational shaft of the shift mode selection unit;
a second magnet installed to surround the first magnet;
a sensor configured to sense variation in magnetic flux density generated between the first magnet and the second magnet; and
a rotation preventing part configured to prevent rotation of the shift mode selection unit when a certain shift mode is selected by the shift mode selection unit.

10. The automotive transmission of claim 2, wherein the automatic shift mode and the manual shift mode share a gate plate.

11. The automotive transmission of claim 1, wherein the shift lever is configured to move in the first direction that includes the first set of shift positions by rotating with respect to a first shaft, and move in the second direction that includes the second set of shift positions by rotating with respect to a second shaft located below the first shaft such that the first shaft and the second shaft cross each other at a specific angle.

12. The automotive transmission of claim 11, wherein one end of the shift lever is inserted into an insertion groove formed in the second shaft such that the shift lever is hinge-coupled with the second shaft via a bearing.

13. The automotive transmission of claim 11, wherein a first groove is formed in the second shaft to generate an operation feeling when the shift lever moves in the first direction, and
a first bullet is positioned in the first groove, one side of the first bullet being connected to a spring.

14. The automotive transmission of claim 11, wherein the shift blocking unit comprises:
a first shift blocking unit configured to block movement of the shift lever in the first direction; and
a second shift blocking unit configured to block movement of the shift lever in the second direction.

15. The automotive transmission of claim 14, wherein the first shift blocking unit comprises:
a blocking groove formed in the second shaft; and
a first blocking part having a rod inserted into or separated from the blocking groove.

16. The automotive transmission of claim 14, wherein the second shift blocking unit comprises:
a blocking member fixedly installed at one end of the second shaft, a blocking protrusion being formed at one side of the blocking member; and
a second blocking part having a rod positioned in a moving path of the blocking protrusion in rotation of the second shaft.

17. The automotive transmission of claim 16, wherein a second groove is formed at one side of the blocking member to generate an operation feeling when the shift lever moves in the second direction, and
a second bullet positioned in the second groove, one side of the second bullet being connected to a spring.

18. The automotive transmission of claim 17, wherein the second groove is formed to have a larger depth as the second groove progresses inward, and
when the second bullet moves toward an outside of the second groove by rotation of the second shaft, the second shaft is restored to its original position by a slanting surface of the second groove.

19. The automotive transmission of claim 11, further comprising a restoring part configured to restore the shift lever to a neutral position when one of the first shift mode and the second shift mode is selected by the shift mode selection unit.

20. The automotive transmission of claim 19, wherein the restoring part is configured to restore the shift lever to the neutral position when an automatic shift mode is selected in a state where a shift position of a manual shift mode is selected.

21. The automotive transmission of claim 19, wherein the restoring part comprises:
a lead screw installed in a longitudinal direction of the second shaft;
a gear engaged and rotated with the lead screw; and
a motor configured to rotate the gear,
wherein the restoring part restores the shift lever to the neutral position by actuating the motor in a state where a shift position of a manual shift mode is selected.

22. The automotive transmission of claim 11, further comprising a position sensing unit which includes:
a magnet installed on one side of an insertion groove formed in the second shaft; and
a sensor configured to sense a magnetic flux density of the magnet.

23. The automotive transmission of claim 1, wherein the shift mode selection unit comprises a display part that is configured to display shift positions of the selected shift mode.

24. The automotive transmission of claim 23, wherein the display part displays selectable shift positions and a currently selected shift position in the selected shift mode.

\* \* \* \* \*